United States Patent [19]
Hasegawa

[11] Patent Number: 5,929,600
[45] Date of Patent: Jul. 27, 1999

[54] BATTERY PACK AND METHOD OF PRODUCING THE SAME

[75] Inventor: Hiroyuki Hasegawa, Asaka, Japan

[73] Assignee: Fuji Photo Film Co., Ltd., Kanagawa, Japan

[21] Appl. No.: 08/831,930

[22] Filed: Apr. 2, 1997

[30] Foreign Application Priority Data

Apr. 8, 1996 [JP] Japan ..................................... 8-085019

[51] Int. Cl.$^6$ .............................. H02J 7/00; H01M 2/22
[52] U.S. Cl. ............................................ 320/112; 429/122
[58] Field of Search .................................. 320/134, 136, 320/112, 116, 118, 128; 429/7, 92, 99, 123, 122, 149, 158, 160, 161

[56] References Cited

U.S. PATENT DOCUMENTS 4,920,019  4/1990  Stoklosa et al. ......................... 429/158
5,466,545  11/1995  Chamberlain et al. ................... 429/99
5,547,775  8/1996  Eguchi et al. ........................... 320/116

*Primary Examiner*—Peter S. Wong
*Assistant Examiner*—K. Shin
*Attorney, Agent, or Firm*—Birch, Stewart, Kolasch & Birch, LLP

[57] ABSTRACT

A battery pack having reduced material costs and a method of producing the same are disclosed. The battery pack includes primary conductors through which a charge and a discharge current of the battery pack flow, and secondary conductors through which comparatively small current flow. Primary conductors are connected to an electric circuit via the secondary conductors. The secondary conductors are formed of a material having a higher electric specific resistance than a material constituting the primary conductors.

20 Claims, 9 Drawing Sheets

BATTERY PACK AND METHOD OF PRODUCING THE SAME

BACKGROUND OF THE INVENTION

1. Field of the Invention

The present invention relates to a battery pack loaded with a secondary battery for powering a desired apparatus and, more particularly, to conductors for connecting, e.g., the secondary battery and an electric circuit built in the battery pack.

2. Description of the Background Art

It is a common practice with a battery pack to connect the output terminals of the battery pack to the electrodes of a secondary battery stored therein or the electrodes of a plurality of secondary batteries by use of metal plates. An electric circuit is built in some conventional battery packs. The electric circuit may be implemented as, e.g., a circuit for protecting the secondary battery or batteries from overcharge and overdischarge, a temperature fuse for shutting off current flow through the batteries when the batteries heat rises above a preselected temperature, a current fuse for shutting off the current when the current increases above a preselected value, a circuit for displaying the amount of charge available with the batteries, or a circuit for preventing the batteries from being charged by a reverse current.

The electric circuit configured to protect the batteries from overcharge and overdischarge, as mentioned above, generally operates in accordance with either one of two different schemes. One scheme monitors the voltage of the individual battery while the other scheme monitors the overall voltage of the batteries. In any case, electrical connection to be set up in the battery pack includes connection between the batteries, connection within the electric circuit, and connection between the batteries, output terminals for connecting the battery pack to an apparatus body to which the pack is mounted, and electric circuit. For such electrical connection, metal plates or wires or similar conductive materials are used.

A conductor for connecting the secondary batteries, conductors for connecting the batteries to the output terminals, and conductors for connecting the above conductors or the batteries to the electric circuit have customarily been formed of a material having a low electric specific resistance. This is because a current flowing through the conductor connecting the batteries and the conductors connecting the batteries and output terminals is relatively great, so that a voltage drop and heat ascribable to the resistance of the conductors are not negligible. However, the problem with the conventional electrical connection is that materials having low electric specific resistances are expensive.

SUMMARY OF THE INVENTION

It is therefore an object of the present invention to provide a battery pack requiring a minimal material cost, and a method of producing the same.

In accordance with the present invention, a battery pack loaded with a secondary battery includes a first conductor through which a charge current or a discharge current of the battery pack selectively flows. Neither the charge current nor the discharge current flows through a second conductor. An electric circuit is connected to at least one of the secondary battery and first conductor via the second conductor. The second conductor is formed of a material having a higher electric specific resistance than a material constituting the first conductor.

Also, in accordance with the present invention, a method of producing a battery pack loaded with a secondary battery includes a step of preparing a first conductor through which a charge current or a discharge current of the battery pack selectively flows. A second conductor is prepared through which a current other than the charge current and the discharge current flows. At least one of the secondary battery and first conductor is connected to an electric circuit via the second conductor. The second conductor is formed of a material having a higher electric specific resistance than a material constituting the first conductor.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Preferred embodiments of the battery pack in accordance with the present invention will be described hereinafter. The illustrative embodiments are applicable to portable electronic apparatuses including a home VTR (Video Tape Recorder) with a video camera and a notebook type personal computer.

First Embodiment

Figure 1:
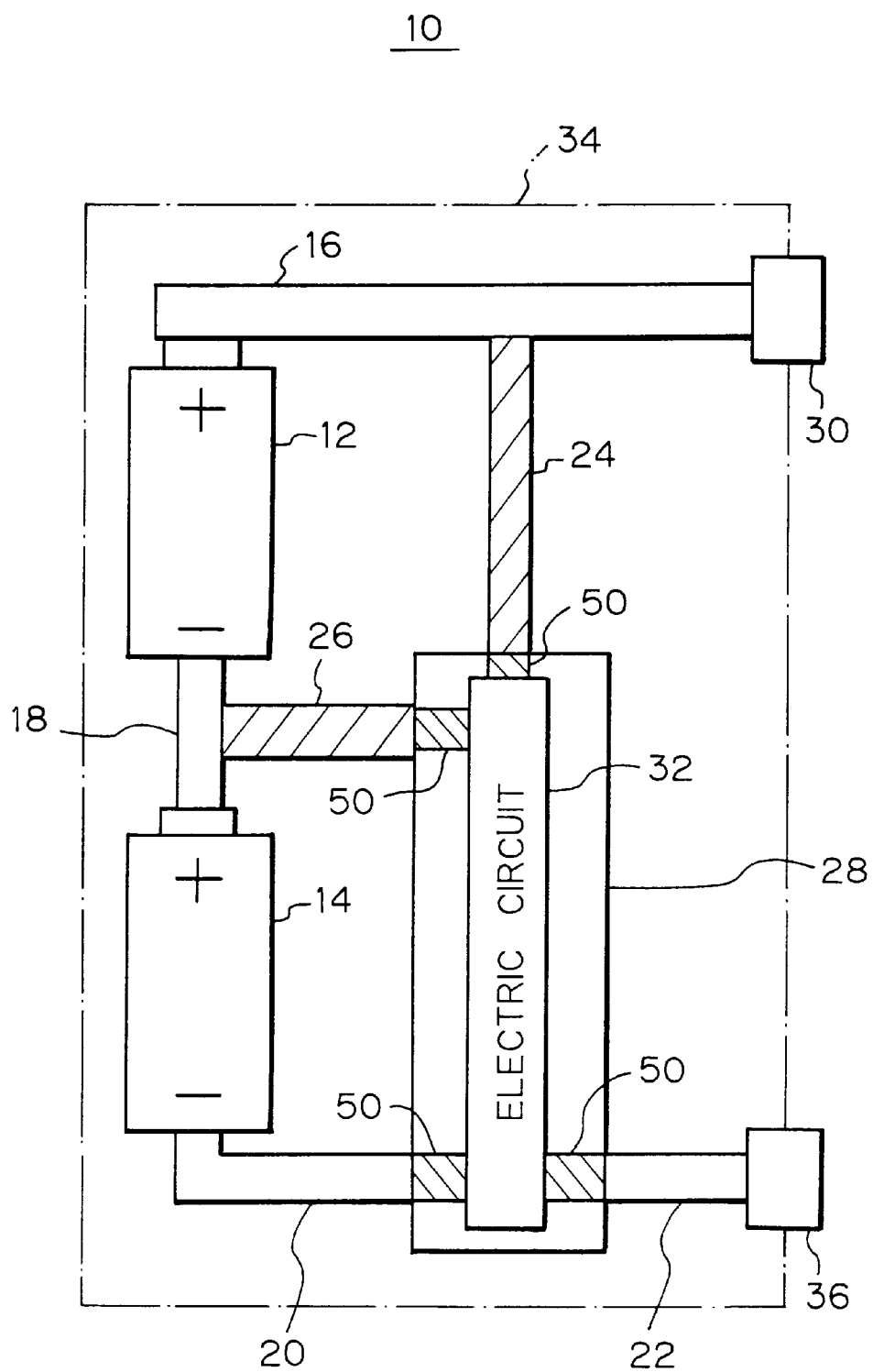
FIG. 1 is a plan view showing a first embodiment of a battery pack in accordance with the present invention.

Referring to FIG. 1 of the drawings, a battery pack 10 embodying the present invention is shown and includes two secondary batteries, or cells as sometimes referred to hereinafter, 12 and 14. A charge and a discharge current of the battery pack 10 flow through conductors 16, 18, 20 and 22, but they do not flow through conductors 24 and 26. A circuit board 28 is connected to the conductors 20–26 and includes an electric circuit 32. Output terminals 30 and 36 are electrically connected to an apparatus body, not shown, to which the battery pack 10 is mounted. The above constituents 12–32 are accommodated in a casing 34. A conductive wiring pattern 50 is printed on the circuit board 28.

In the illustrative embodiment, the conductors 16–26 are classified into two groups with respect to the size of a current to flow therethrough. The conductors 16–22 form a group causing the charge and discharge currents of the pack battery 10 having a relatively great value to flow therethrough. The conductors 24 and 26 form the other group not causing the charge and discharge currents to flow therethrough; only a comparatively small current flows through the conductors 24 and 26. This embodiment is characterized in that the material constituting the conductors 24 and 26 has a higher specific resistance, or volume resistivity, than the material constituting the conductors 16–22. The specific resistance is the reciprocal of electric conductivity. For example, the conductors 16–22 may be formed of copper or nickel while the conductors 24 and 26 may be formed of aluminum or steel. The crux is that the material constituting the conductors 16–22 has a lower specific resistance than the material constituting the conductors 24 and 26.

Generally, materials having low specific resistance are more expensive than materials having high specific resistances. Therefore, selecting the materials of the conductors on the basis of the current to flow therethrough reduces the cost of the battery pack 10.

The secondary batteries or cells 12 and 14 are implemented as Li (lithium) ion cells, Ni (nickel) hydrogen cells or Ni-Cd (nickel-cadmium) cells by way of example, and each has a circular or rectangular cross-section. In this embodiment, the two cells 12 and 14 are connected in series via the conductor 18. The cells 12 and 14 are connected to the output terminals 30 and 36 via the conductors 16, 20 and 22.

A discharge current from the cells 12 and 14 and a charge current to the cells 12 and 14 flow through the conductors 16–22. When the cells 12 and 14 are Li ion cells by way of example, the current to flow through the conductors 16–22 is usually about 0.3 A to 3 A and sometimes rises to about 10 A for a moment. In light of this, the conductors 16–22 are implemented by plates or wires of copper, nickel or similar conductive material having a low specific resistance. The conductor 16 connects the cell 12 and output terminal 30 and is, in turn, connected to the conductor 24. The conductor 18 is connected to the conductor 26. The conductor 20 connects the cell 14 and circuit board 28. Further, the conductor 22 connects the circuit board 28 and output terminal 36.

The conductors 24 and 26 connect the circuit board 28 and conductors 16 and 18. In the illustrative embodiment, the electric circuit 32 for protecting the cells 12 and 14 is mounted on the circuit board 28. The conductors 24 and 26 allow the electric circuit 32 to monitor, or sense, the voltages of the cells 12 and 14. The current to flow through the voltage monitoring conductors 24 and 26 is about 1 pA to 10 mA. Therefore, the conductors 24 and 26 are implemented by plates or wires of aluminum, steel or similar material having a low specific resistance and satisfying the previously stated condition.

In the embodiment, the electric circuit 32 is so configured as to protect the cells 12 and 14 from overcharge and overdischarge, as will be described specifically later.

Figure 2:
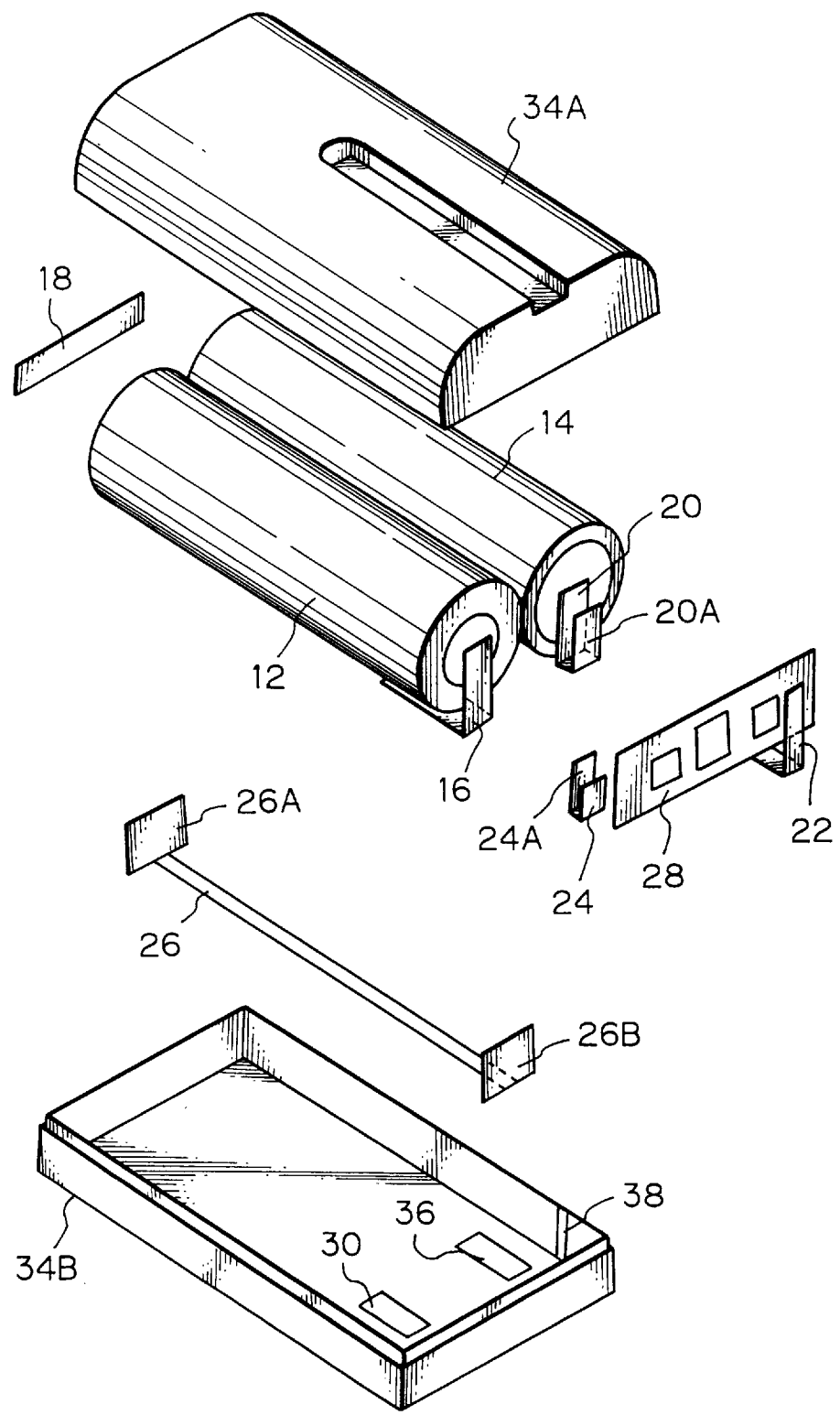
FIG. 2 is an exploded perspective view showing a mechanical arrangement of the first embodiment.

The battery pack 10 is shown in FIG. 2 in an exploded perspective view. As shown, the casing 34 consists of an upper casing part 34A and a lower casing part 34B engageable with each other. The cells 12 and 14 are accommodated in the casing 34 in parallel with each other and connected in series, as stated earlier. The cells 12 and 14 are therefore positioned such that the positive electrode or pole of the cell 12 and the negative electrode or pole of the cell 14 are inversely parallel. The flat conductor 18 is welded to the cells 12 and 14 so as to electrically connect them together.

The conductor 16 is a flat member bent in the form of a letter L and welded to the positive pole of the cell 12. The horizontal portion of the conductor 16 is held in contact with the output terminal 30. The conductor 16 is a flat member bent in the form of a letter U and welded to the negative pole of the cell 14. A part 20A of the conductor 20 facing the circuit board 28 is held in contact with a preselected portion of the circuit board 28 due to the resiliency of the conductor 20. If desired, the resiliency holding the conductor 20 in contact with the circuit board 28 may be replaced with welding, crimping, adhesion or similar technology.

The output terminals 30 and 36 are respectively fitted in through holes formed in the lower casing part 34B. The inner surfaces of the output terminals 30 and 36 are held in contact with the conductors 16 and 22, respectively. The outer surfaces of the output terminals 30 and 36 are held in contact with input terminals, not shown, included in the apparatus body. The battery pack 10 feeds power to the apparatus body via the output terminals 30 and 36 and the input terminals of the apparatus body.

Grooves 38 (only one is visible) are formed in the inner surfaces of the opposite side walls of the lower casing part 34B. The circuit board 28 is received in the grooves 38 at its opposite side edges and affixed to the casing part 34B thereby. The conductors 22 and 24 are affixed to the circuit board 28 by welding, crimping, adhesion or similar technology. The conductor 22 is a flat member bent in the form of a letter L and has its horizontal portion held in contact with the output terminal 36. The conductor 24 is a flat member bent in the form of a letter U. A part 24A of the conductor 24 facing the cell 12 remains in contact with the cell 12 due to the resiliency of the conductor 24. The resiliency holding the conductor 24 in contact with the cell 12 may also be replaced with welding, crimping, adhesion or similar technology, if desired.

The conductor 26 includes a portion 26A welded to the conductor 18 and a portion 26B connected to a preselected portion of the circuit board 28. For the connection of the portion 26B, there may be used resiliency, welding, crimping or adhesion by way of example.

The functions and operation of the electric circuit 32 will be described with reference to FIG. 3. The electric circuit 32 is a safety implementation against overcharge and overdischarge. As shown, the circuit 32 has a controller 40, a switch 42 for shutting off a charge path, a diode 46 for discharge, a switch 44 for shutting off a discharge path, and a diode 48 for charge. The controller 40 monitors the voltage of the individual cell 12 or 14 via the conductors 20, 24 and 26 and controls the switches 42 and 44 on the basis of the voltage. In this sense, the controller 40 plays the role of a switch control circuit. When the voltage of at least one of the cells 12 and 14 increases above a first reference voltage, the controller 40 generates a control signal for turning off, or opening, the switch 42 and feeds it to the switch 42 via a control line 60. As a result, the charge path is shut off to stop charging the cells 12 and 14 before the cell 12 or 14 is overcharged.

Assuming that the cells 12 and 14 are Li ion cells, then the first reference voltage is selected, as follows. The normal operation voltage of Li ion cells ranges from 2.5 V to 4.2 V for a cell. The performance of the individual Li ion cell sharply falls when it is charged above about 4.3 V. The first reference voltage is therefore selected to lie in the range of from 4.2 V to 4.3 V.

When the voltage of at least one of the cells 12 and 14 decreases below a second reference voltage, the controller 40 generates a control signal for turning off, or opening, the switch 44 and feeds it to the switch 44 via a control line 62. As a result, the discharge path is shut off to stop discharging the cells 12 and 14 before the cell 12 or 14 is overdischarged.

Again, assuming that the cells 12 and 14 are Li ion cells, then the second reference voltage is selected, as follows. The normal operation voltage of Li ion cells ranges from 2.5 V to 4.2 V for a cell, as stated previously. The performance of the individual Li ion cell sharply falls when it is discharged below about 2.4 V. The second reference voltage is therefore selected to lie in the range of from 2.4 V to 2.5.

The diode 46 is connected in parallel to the switch 42 so as to guarantee a discharge path when the switch 42 is open. Likewise, the diode 48 is connected in parallel to the switch 44 so as to guarantee a charge path when the switch 44 is open.

The switches 42 and 44 are implemented by semiconductor devices. Preferably, FETs (Field Effect Transistors) are desirable because they are of power driven type involving a minimum of power loss, a leak current of less than 100 μm in the event of shutoff, and a minimum of power consumption.

The conductors 20–26 are connected to the circuit board 28 at connecting portions 52, 54, 56 and 58, respectively.

As stated above, in the illustrative embodiment, the conductors 16–22 are formed of a conductive material having a low specific resistance while the conductors 24 and 26 are formed of a material having a high specific resistance and relatively low cost. Therefore, the battery pack 10 is lower in cost than the conventional battery pack in which all the conductors are formed of the same conductive material having a low specific resistance. Because the current to flow through the conductors 24 and 26 is small, using the metal of high specific resistance does not have any negative effects.

Second Embodiment

Figure 4:
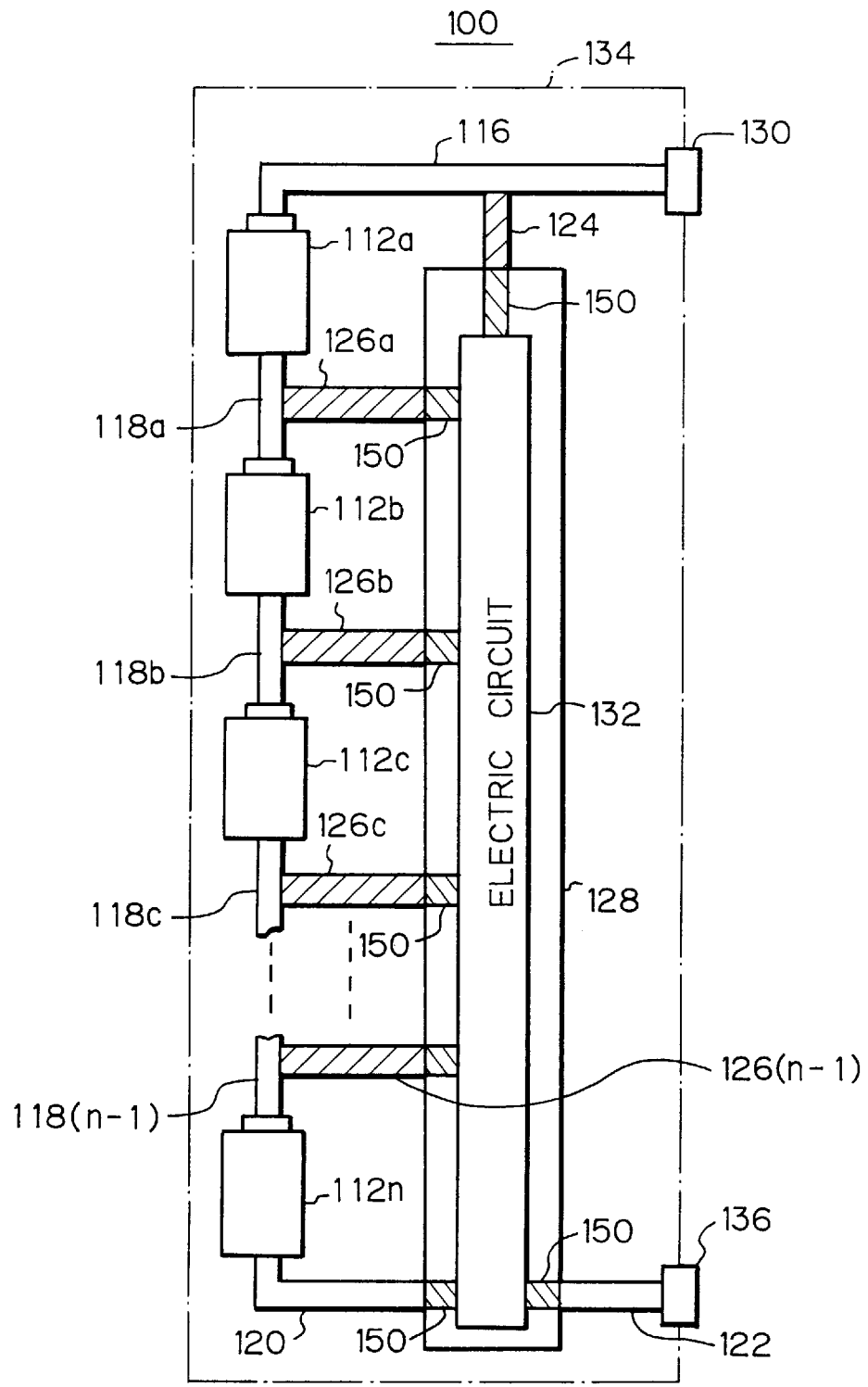
FIG. 4 is a plan view showing a second embodiment of the present invention.
Figure 5:
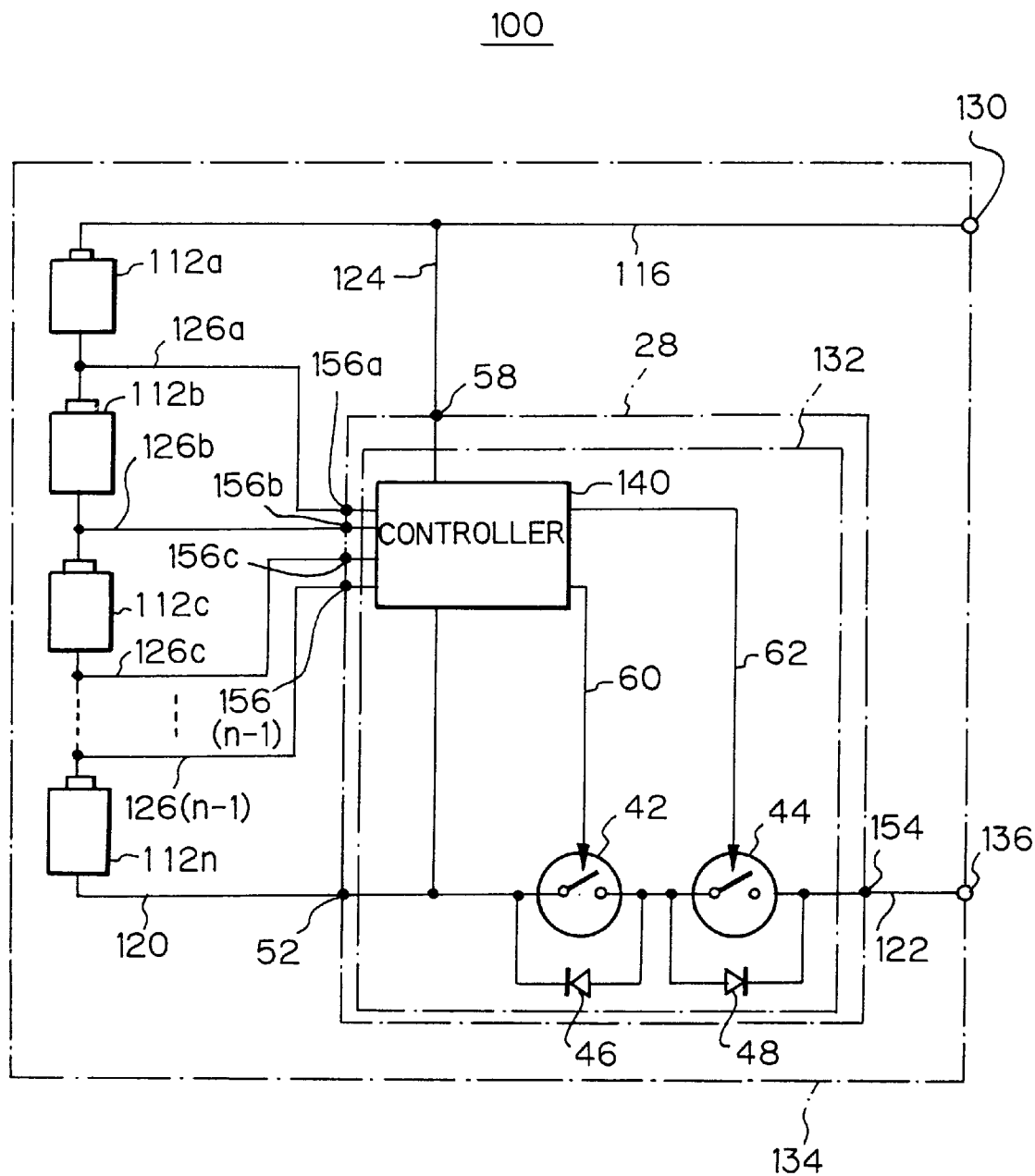
FIG. 5 is a block diagram schematically showing an electrical arrangement of the second embodiment.

Reference will be made to FIGS. 4 and 5 for describing a second embodiment of the present invention. As shown, a battery pack, generally 100, is loaded with n secondary batteries 112a–112n connected in series. An electric circuit 132, like the circuit 32 of the first embodiment, is directed toward the protection of the batteries 112a–112n from overcharge and overdischarge.

Conductors 116, 118a–118(n−1), 120 and 122 allow a relatively great current, e.g., a current fed from the batteries 112a–112n to the outside via output terminals 130 and 136 (discharge current) to flow therethrough. Such a current does not flow through any of conductors 124 and 126a–126(n−1). The conductors 116–122 are formed of a conductive material having a specific resistance lower than that of the material constituting the conductors 124 and 126a–126(n−1). There are also shown in FIGS. 4 and 5 a circuit board 128, a casing 134, and a conductive wiring pattern 150 formed on the circuit board 128.

FIG. 5 is a block diagram showing the electrical arrangement of the second embodiment. In FIG. 5, circuit elements identical in function with the elements shown in FIG. 3 are designated by identical reference numeral, and a detailed description thereof will not be made in order to avoid redundancy. As shown, a controller 140 included in the electric circuit 132 monitors the terminal voltages of the secondary batteries 112a–112n, and turns off the switch 42 assigned to the charge path when any one of the terminal voltages rises above the first reference voltage. When any one of the terminal voltages of the batteries 112a–112n drops below the second reference voltage, the controller 140 turns off the switch 44 assigned to the discharge path. In this manner, the illustrative embodiment is operable with a number of secondary batteries.

Third Embodiment

Figure 6:
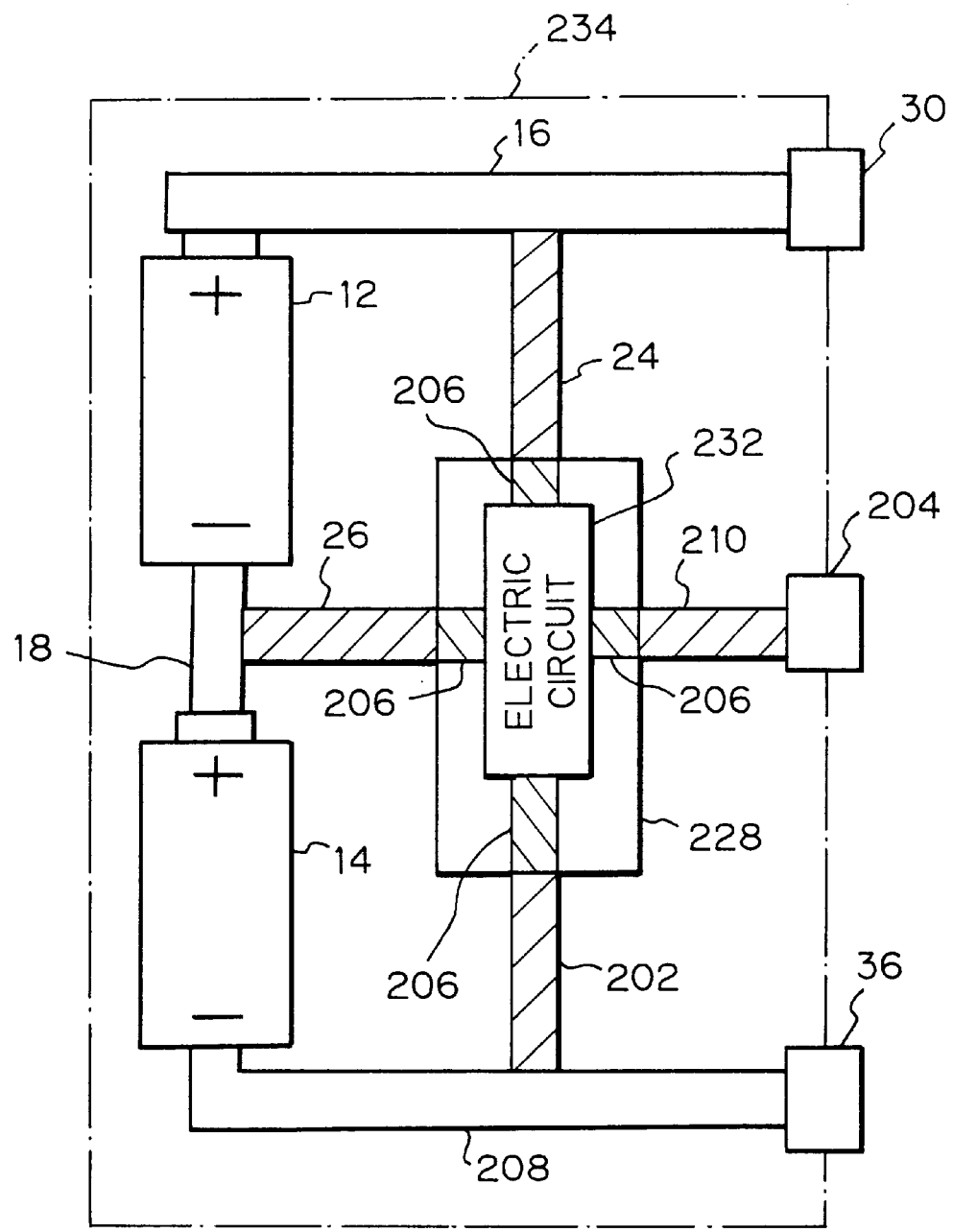
FIG. 6 is a plan view showing a third embodiment of the present invention.

A third embodiment of the present invention will be described with reference to FIG. 6. In FIG. 6, circuit elements identical in function with the elements shown in FIG. 1 are designated by identical reference numerals, and a detailed description thereof will not be made in order to avoid redundancy. As shown, a battery pack, generally 200, includes an electric circuit 232 mounted on a circuit board 228. In this embodiment, the electric circuit 232 simply detects the overcharge or the overdischarge of the secondary batteries 12 and 14 and reports it to the apparatus body to which the battery pack 200 is mounted. In response, the apparatus body shuts off a charge current or a discharge current.

Why the battery pack 200 does not have the function of shutting off a charge and a discharge current is as follows. The battery packs 10 and 100 shown in FIGS. 1 and 4, respectively, each has the above function in order to enhance its own reliability and safety operation. Usually, however, an apparatus body to be powered by such a battery pack has a function of shutting off a charge and a discharge current within itself. In this respect, providing the battery pack with such a function would sometimes be redundant.

Assume that the function of shutting off a charge and a discharge current should preferably not be provided in the battery pack in order to, e.g., reduce the cost of the battery pack. Then, omitting the above function from the battery pack successfully simplifies the circuitry of the battery pack and reduces the cost, compared to the first and second embodiments.

As shown in FIG. 6, the battery pack 200 includes conductors 202, 208 and 210 in addition to the conductors 16, 18, 24 and 26 shown in FIG. 1. The conductors 16, 18 and 208 through which a charge and a discharge current flow are formed of a material having a lower specific resistance than the conductors 24, 26, 202 and 210 through which the above currents do not flow. The conductors 24, 26 and 202 are welded to the conductors 16, 18 and 208, respectively. There are also shown in FIG. 6 a wiring pattern 206 formed on the circuit board 228, a communication terminal 204 which will be described, and a casing 234.

Figure 3:
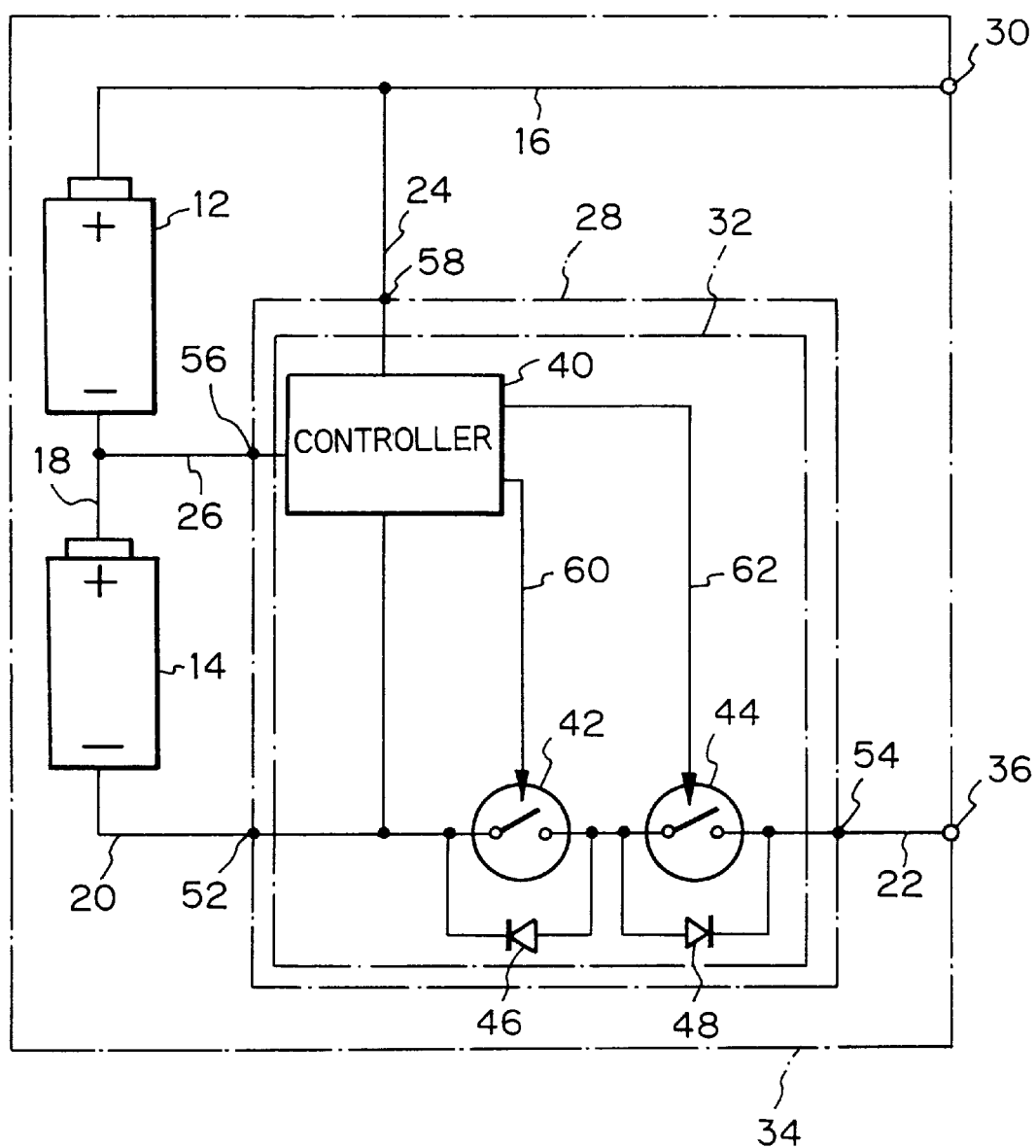
FIG. 3 is a block diagram schematically showing an electrical arrangement of the first embodiment.

The electric circuit 232 includes a controller, not shown, operable in the same manner as the controller 40 shown in FIG. 3. Specifically, the controller monitors the terminal voltages of the cells 12 and 14 via the conductors 24, 26 and 202. The controller determines, based on the reference voltages described with reference to FIG. 3, whether or not to shut off a charge current or a discharge current. A signal representative of the result of decision and for requesting the shut-off of the current is sent from the controller to the apparatus body via the conductor 210 and communication terminal 204.

The conductor 210 may be implemented as two conductive wires like the control lines 60 and 62 shown in FIG. 3, if desired. When the conductor 210 is in the form of a single conductive wire, a signal requesting the shut-off of a charge current and a signal requesting the shut-off of a discharge current may be distinguished on the basis of a signal level.

Fourth Embodiment

Figure 7:
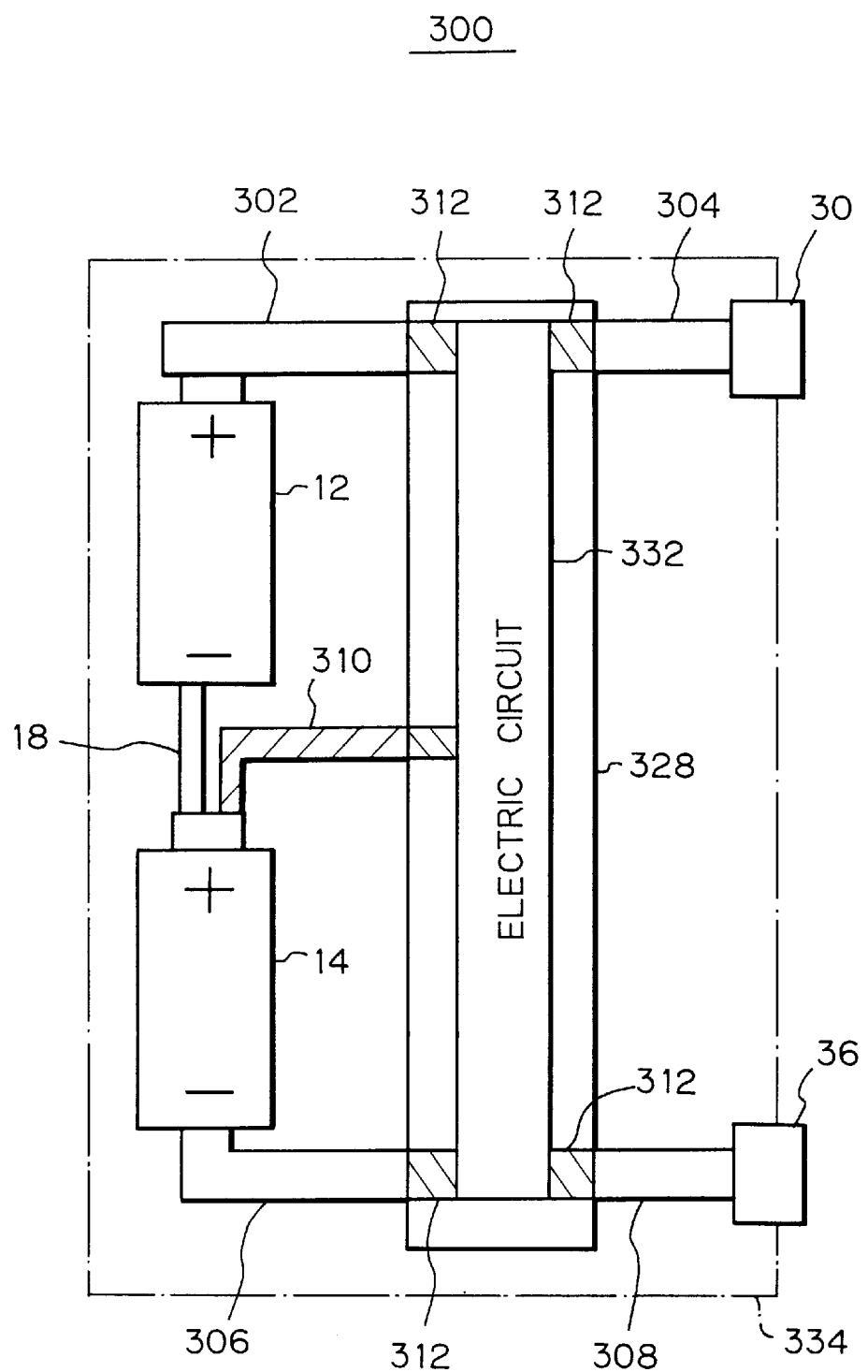
FIG. 7 is a plan view showing a fourth embodiment of the present invention.

FIG. 7 shows a fourth embodiment of the present invention. As shown, a battery pack, generally 300, has conductors 302, 304, 306, 308, 310, a wiring pattern 312 formed on a circuit board 328, an electric circuit 332 and a casing 334 in addition to the secondary cells 12 and 14, conductor 18, and output terminals 30 and 36 shown in FIG. 1. This embodiment is similar to the first embodiment except for the configuration of the electric circuit 332, and therefore the arrangement of the conductors.

In the illustrative embodiment, the charge and discharge currents of the battery pack 300 flow through the electric circuit 332 without exception. The electric circuit 332 will be described in detail later. The charge and discharge currents flow through the conductors 302, 304, 306 and 308, but not through the conductor 310. The conductors 302–308 therefore have a lower specific resistance than the conductor 310. The connecting portions where a great current flows, e.g., the portions where the conductors 18, 302 and 306 and cells 12 and 14 are connected and portions where the conductors 304 and 308 and output terminals 30 and 36 are connected may be implemented by welding. On the other hand, the portions where a small current flows, e.g., the portions where the conductor 3410 and cell 14 are connected may be implemented by conductive adhesive because adhesion facilitates the connection more so than welding.

Figure 8:
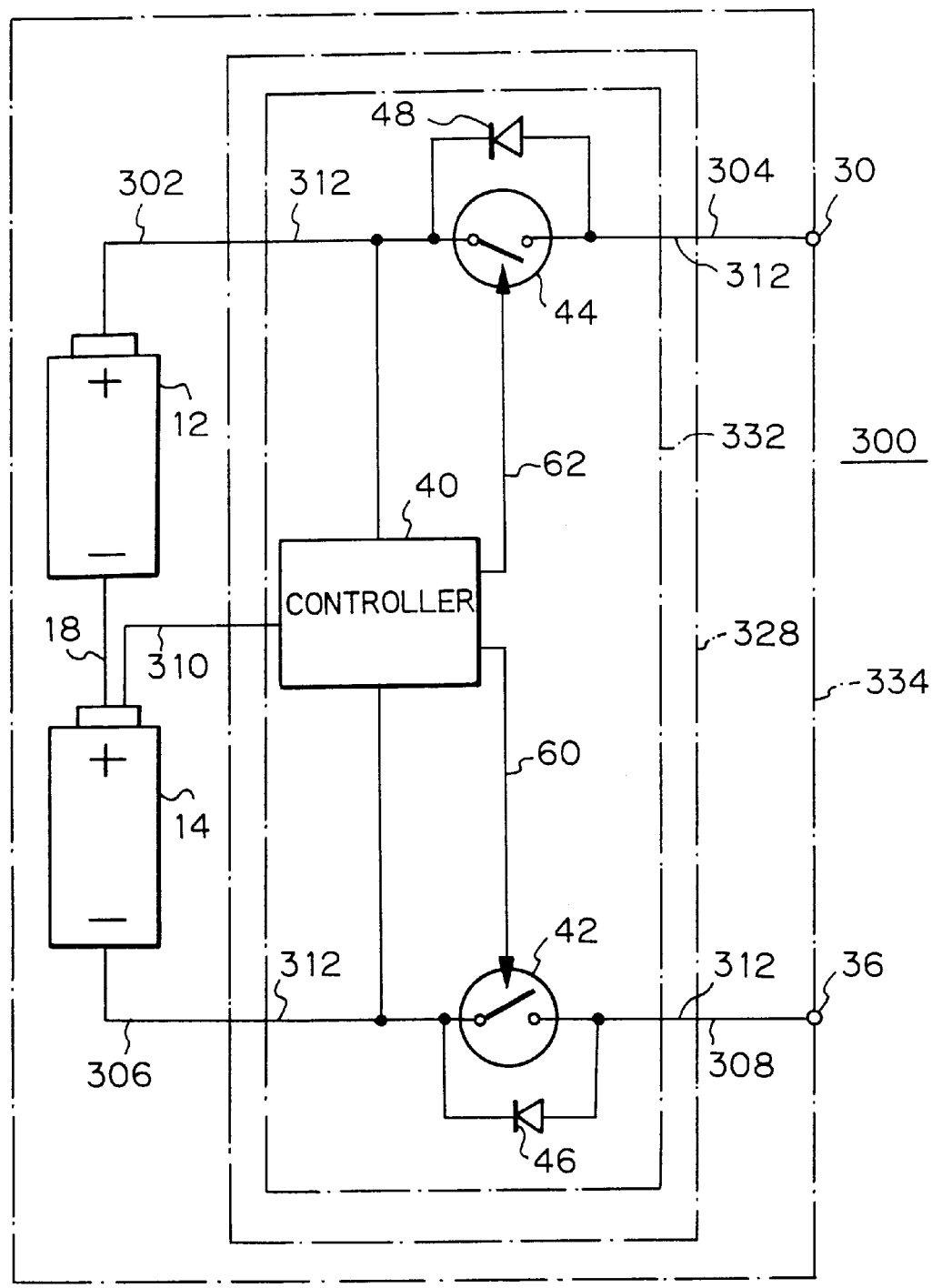
FIG. 8 is a block diagram schematically showing an electrical arrangement of the fourth embodiment.

FIG. 8 shows the electric circuit 332 specifically. As shown, the electric circuit 332 is different from the electric circuit 32, FIG. 32, in that the switch 42 for shutting off a charge current and the diode 46 located on the discharge path are connected to the negative terminal 36, and in that the switch 44 for shutting off a discharge current and the diode 48 located on the charge path are connected to the positive terminal 30. That is, the switches 42 and 44 are not near to each other in this embodiment. Therefore, when one of the switches 42 and 44 is turned off by the controller 40, the resulting extremely high voltage is prevented from being applied to the other switch. This successfully reduces the deterioration of the switches 42 and 44 and thereby enhances their lives and reliability. In FIG. 8, circuit elements identical in function with the elements shown in FIG. 3 are designated by identical reference numerals, and a detailed description thereof will not be made in order to avoid redundancy.

Fifth Embodiment

Figure 9:
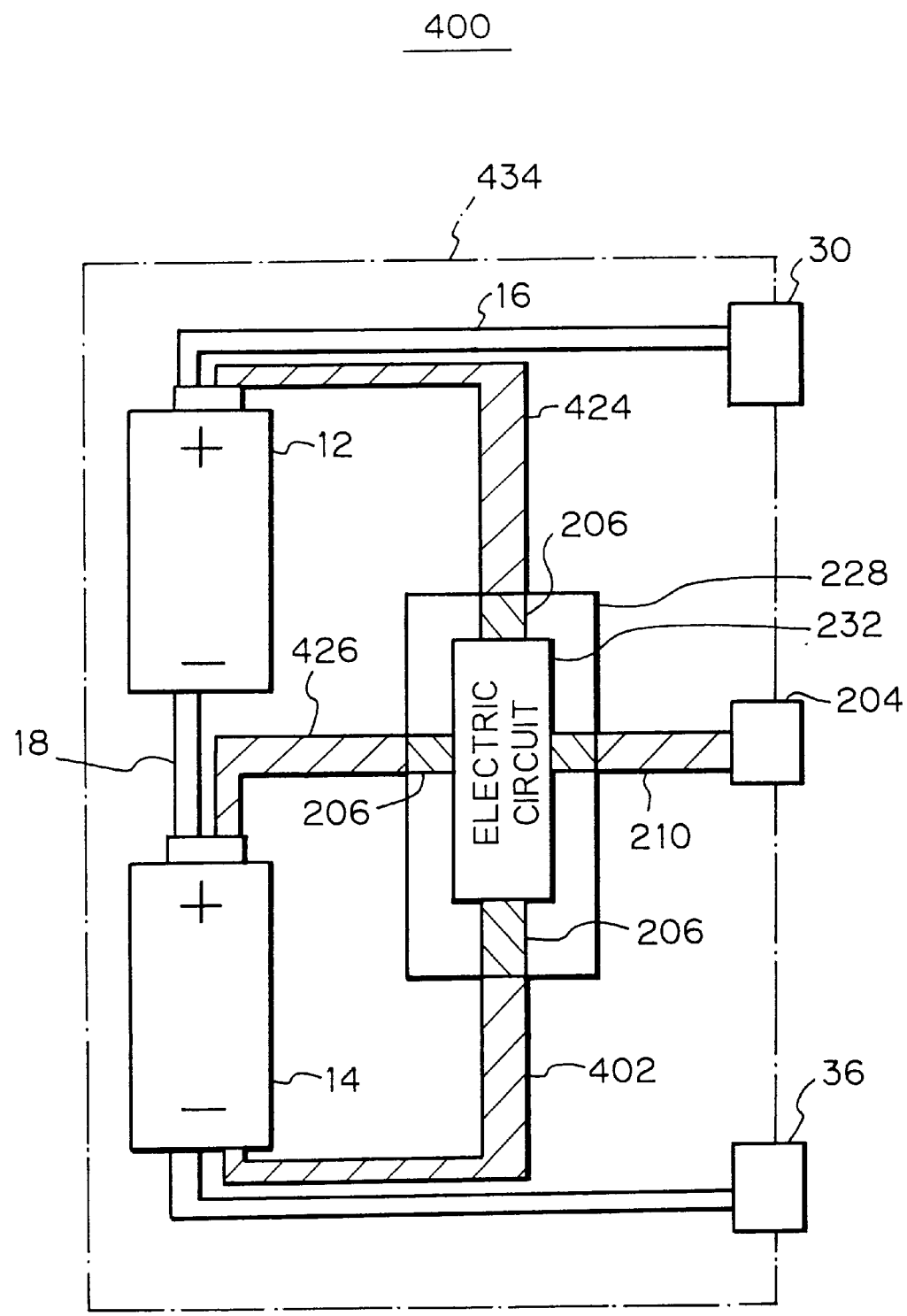
FIG. 9 is a plan view showing a fifth embodiment of the present invention.

Referring to FIG. 9, a battery pack representative of a fifth embodiment of the present invention will be described which is a modification of the third embodiment shown in FIG. 6. As shown, a battery pack, generally 400, includes conductors 402, 424 and 426 and a casing 434. A discharge current and a charge current do not flow through the conductors 402, 424 and 426. This embodiment differs from the third embodiment in that the conductors 402, 424 and 426 are connected to the cells 12 and 14 by conductive adhesive. Adhesion facilitates the connection more so than welding, as stated earlier.

While the present invention has been described with reference to the particular illustrative embodiments, it is not to be restricted by the embodiments. It is to be appreciated that those skilled in the art can change or modify the embodiments without departing from the scope and spirit of the present invention. For example, in each of the illustrative embodiments, the circuit board is loaded with the electric circuit and then bodily built in the casing. Alternatively, the circuit elements constituting the electric circuit may be directly built in the casing without the intermediary of the circuit board. In such a case, the conductors connected to the circuit board, e.g., the conductors 20–26 shown in FIG. 1 will be directly connected to the controller 40, switches 42 and 44, etc. However, loading the circuit board with the electric circuit and then setting the circuit board in the casing is more desirable because it allows the parts other than the circuit board to be set in the casing in parallel with the assemblage of the circuit board and thereby enhances productivity. In addition, loading the circuit board with the electric circuit is more efficient than setting the electric circuit directly in the casing.

While the conductors of the embodiments are formed of a single material, they may, of course, be implemented as metal coated plates or wires with a different kind of metal or even as a laminate of metal plates. As for a composite conductor formed of different kinds of materials, the size of the specific resistance can be estimated in terms of the effective specific resistance, i.e., (resistance of entire conductor)×sectional area of conductor)/(entire length of conductor). A composite conductor having a low effective specific resistance and a composite conductor having a high effective specific resistance will be respectively applied to the conductors through which a charge and a discharge current flow and the other conductors through which they do not flow.

The conductors through which a charge and a discharge current do not flow, e.g., the conductors 24 and 26 shown in FIG. 1 may be formed of any suitable material other than metal. For example, this kind of conductors may be implemented as plates or wires of carbon or conductive resin. As for the conductors 24 and 26, for example, it is possible to reduce the cost by using a material whose specific resistance is low. However, when a plurality of conductors are present through which a charge and a discharge current do not flow, it is not necessary to form all of them out of a material whose specific resistance is low. Forming only a part of the conductors out of such a material will, of course, save the cost.

While the embodiments use the conductors formed of a material having a low specific resistance to connect the secondary batteries and the preselected points of the circuit board, such conductors may, of course, be applied to the wirings on the circuit board.

In the embodiments, the electric circuits are so configured as to protect the secondary batteries from overcharge and overdischarge. The present invention is similarly practicable when the electric circuit is implemented as, e.g., a temperature fuse for shutting off a current flowing through the batteries when the the batteries heat above a preselected temperature, a current fuse for shutting off the current when it rises above a preselected value, a circuit for displaying the amount of charge available with the batteries, or a circuit for preventing the batteries from being charged by a reverse current.

What is claimed is:

1. A battery pack having a secondary battery, comprising:
    a first conductor through which a charge current or a discharge current of said battery pack selectively flows;
    a second conductor; and
    an electric circuit monitoring battery charge/discharge connected to at least one of said secondary battery and said first conductor via said second conductor;
    wherein substantially the entire length of said second conductor is formed of a material having a higher electric specific resistance than a material forming first conductor to thereby reduce manufacturing costs.

2. A battery pack in accordance with claim 1, wherein said electric circuit prevents said secondary battery from overcharging.

3. A battery pack in accordance with claim 1, wherein said electric circuit prevents said secondary battery from overdischarging.

4. A battery pack having a secondary battery, comprising:
- a first conductor through which a charge current or a discharge current of said battery pack selectively flows;
- a second conductor; and
- an electric circuit monitoring battery charge/discharge connected to at least one of said secondary battery and said first conductor via said second conductor;
- wherein substantially the entire length of said second conductor is formed of a material having a higher effective electric resistance than a material forming said first conductor to thereby reduce manufacturing costs.

5. A battery pack in accordance with claim 4, wherein said electric circuit prevents said secondary battery from over-charging.

6. A battery pack in accordance with claim 4, wherein said electric circuit prevents said secondary battery from over-discharging.

7. A battery pack having a secondary battery comprising:
- a first conductor through which a charge current or a discharge current of said battery pack selectively flows;
- a second conductor; and
- a circuit board including an electric circuit monitoring battery charge/discharge connected to at least one of said secondary battery and said first conductor via said second conductor;
- wherein substantially the entire length of said second conductor is formed of a material having a higher electric specific resistance than a material forming said first conductor to thereby reduce manufacturing costs.

8. A battery pack in accordance with claim 7, wherein said electric circuit prevents said secondary battery from over charging.

9. A battery pack in accordance with claim 7, wherein said electric circuit prevents said secondary battery from over-discharging.

10. A battery pack having a secondary battery, comprising:
- a first conductor through which a charge current or a discharge current of said battery pack selectively flows;
- a second conductor; and
- a circuit board including an electric circuit monitoring battery charge/discharge connected to at least one of said secondary battery and said first conductor via said second conductor;
- wherein substantially the entire length of said second conductor is formed of a material having a higher effective electric specific resistance than a material forming said first conductor to thereby reduce manufacturing costs.

11. A battery pack in accordance with claim 10, wherein said electric circuit prevents said secondary battery from over charging.

12. A battery pack in accordance with claim 10, wherein said electric circuit comprises a circuit for preventing said secondary battery from over-discharging.

13. A method of producing a battery pack having a secondary battery, comprising the steps of;
- preparing a first conductor through which a charge current or a discharge current of said battery pack selectively flows;
- preparing a second conductor; and
- connecting at least one of said secondary battery and said first conductor to an electric circuit for monitoring battery charge/discharge via said second conductor;
- wherein substantially the entire length of said second conductor is formed of a material having a higher electric specific resistance than a material forming said first conductor to thereby reduce manufacturing costs.

14. A method of producing a battery pack having a secondary battery, comprising the steps of:
- preparing a first conductor through which a charge current or a discharge current of said battery pack selectively flows;
- preparing a second conductor; and
- connecting at least one of said secondary battery and said first conductor to an electric circuit for monitoring battery charge/discharge via said second conductor;
- wherein substantially the entire length of said second conductor is formed of a material having a higher effective electric specific resistance than a material forming said first conductor to thereby reduce manufacturing costs.

15. A battery pack according to claim 1, wherein said first conductor is formed of one of copper and nickel and said second conductor is formed of one of aluminum and steel.

16. A battery pack according to claim 4, wherein said first conductor is formed of one of copper and nickel and said second conductor is formed of one of aluminum and steel.

17. A battery pack according to claim 7, wherein said first conductor is formed of one of copper and nickel and said second conductor is formed of one of aluminum and steel.

18. A battery pack according to claim 10, wherein said first conductor is formed of one of copper and nickel and said second conductor is formed of one of aluminum and steel.

19. A battery pack according to claim 13, wherein said first conductor is formed of one of copper and nickel and said second conductor is formed of one of aluminum and steel.

20. A battery pack according to claim 14, wherein said first conductor is formed of one of copper and nickel and said second conductor is formed of one of aluminum and steel.

* * * * *